United States Patent [19]

Keblys

[11] 4,248,850

[45] Feb. 3, 1981

[54] PREPARATION OF METAL BROMIDES

[75] Inventor: Kestutis A. Keblys, Southfield, Mich.

[73] Assignee: Ethyl Corporation, Richmond, Va.

[21] Appl. No.: 15,067

[22] Filed: Feb. 26, 1979

[51] Int. Cl.³ .................... C01F 11/34; C01G 9/04
[52] U.S. Cl. .................................. 423/491; 423/497; 423/499
[58] Field of Search ............... 423/491, 497, 499, 488

[56] References Cited

U.S. PATENT DOCUMENTS

| | | | |
|---|---|---|---|
| 1,775,598 | 9/1930 | Muelen | 423/499 |
| 1,843,355 | 2/1932 | Behrman | 423/499 |
| 1,863,375 | 6/1932 | Jones | 423/499 |
| 1,916,457 | 7/1933 | Behrman | 423/499 |
| 1,918,622 | 7/1933 | Meulen | 423/499 |
| 2,007,758 | 7/1935 | Harlow et al. | 423/499 |
| 2,269,733 | 1/1942 | Pearson | 423/499 |
| 3,462,241 | 8/1969 | Sediey | 423/497 |
| 4,083,942 | 4/1978 | Sanders | 423/497 |

FOREIGN PATENT DOCUMENTS 285915 9/1928 United Kingdom .................... 423/499

OTHER PUBLICATIONS

Karrer, "Organic Chemistry", Elsevier Publishing Co., New York, 3rd. English Ed., 1947, p. 190.

*Primary Examiner*—Earl C. Thomas
*Attorney, Agent, or Firm*—Donald L. Johnson; John F. Sieberth; Joseph D. Odenweller

[57] ABSTRACT

Metal bromides, and particularly alkali and alkaline earth metal bromides, are prepared from a basic metal compound and bromine in the presence of added formaldehyde as a reducing agent.

12 Claims, No Drawings

PREPARATION OF METAL BROMIDES

BACKGROUND OF THE INVENTION

Preparation of metal bromides from a basic metal compound and bromine in the presence of a reducing agent has been known for a long time.

U.S. Pat. No. 1,775,598 discloses the use of reducing agents which are converted into water and/or gases. These may be nitrogen-containing organic or inorganic compounds such as urea, cyanamide, ammonia, ammonium carbonate, ammonium bicarbonate, formamide, carbamates, and ammonium cyanide; or easily decomposable organic acids such as formic or oxalic acid; or ammonium or metal derivatives of these compounds (e.g. calcium nitride, metal formates, or oxalates. Substances which give similar reducing agents on mixing (e.g. hexamethylenetetramine) are also disclosed. British Pat. No. 285,915 has a similar disclosure.

U.S. Pat. No. 1,843,355 discloses use of charcoal as a reductant. U.S. Pat. No. 1,863,375 and 2,007,758 both relate to use of ammonia as the reducing agent. U.S. Pat. No. 1,916,457 pertains to use of carbon as a reductant, principally in the formation of sodium bromate.

U.S. Pat. No. 2,269,773 also discloses use of a variety of reducing agents and alternative reaction sequences. U.S. Pat. No. 4,083,942 discloses use of formic acid as a reactant, and illustrates the process with the following equation:

$$Ca(OH)_2 + HCOOH + Br_2 \rightarrow CaBr_2 + CO_2 + H_2O$$

In the process of that patent, bromine and the alkaline compound are alternatively and incrementally added to an aqueous mixture of formic acid and a less than equivalent amount of metal compound, while maintaining the pH below 7.0.

U.S. Pat. No. 3,462,241 relates to the reaction of lime and bromine in the absence of a reductant:

$$2Br_2 + 2Ca(OH)_2 \rightarrow Ca(OBr)_2 + 2H_2O + CaBr_2$$

The yield of calcium bromide by this method is about 9–12%.

No reference was found relating to the use of formaldehyde as disclosed by the process of this invention.

SUMMARY OF THE INVENTION

In a major aspect, this invention pertains to a process for preparing metal bromides which comprises contacting in an aqueous medium a basic metal compound and bromine in the presence of added formaldehyde as a reducing agent.

In preferred embodiments, this invention relates to preparation of alkali and alkaline earth metal bromides, more preferably $ZnBr_2$ and $CaBr_2$. Preferably, the formaldehyde is added to the reaction zone as an aqueous solution having a formaldehyde concentration of from about 25 to about 40 weight percent. In another preferred embodiment, formaldehyde is added as solid para formaldehyde.

In a particular aspect, this invention pertains to a process for the preparation of $CaBr_2$, said process comprising reacting lime and bromine in an aqueous reaction medium using added formaldehyde as a reducing agent, said process being carried out by adding separately to a water-lime mixture (i) bromine, and (ii) an aqueous solution of about 25–40% formaldehyde, the relative rates of addition being such that the reaction temperature is maintained in the range of from about 60° to about 90° C. and such that the formaldehyde addition is complete when about two-thirds of the bromine has been added; with the amount of bromine being substantially stoichiometric or slightly less than stoichiometric with respect to said calcium compound; and the amount of formaldehyde added being stoichiometric or slightly in excess of stoichiometry with respect to bromine.

DESCRIPTION OF THE PREFERRED EMBODIMENTS

Preferably, the process of this invention is conducted by contacting a basic metal compound and bromine in the presence of an aqueous medium, and added formaldehyde. Any convenient form of formaldehyde may be used, such as an aqueous solution of formalin or solid paraformaldehyde. The formaldehyde acts as a reducing agent. Alkaline earth metal compounds are preferred as basic metal compounds. A preferred use of the process of this in the preparation of $CaBr_2$ fluid. Preparation of $ZnBr_2$ is also preferred.

As can be seen from the prior art cited above, production of $CaBr_2$ in high yield from lime and bromine requires the use of a reducing agent. Work with ammonia, a reductant used in the prior art, indicates that the by-product from the reduction is nitrogen. Thus, when bromine is added to a lime —$NH_3$—$H_2O$ system, the evolution of nitrogen begins almost immediately. It is believed that the prior art process proceeds as follows:

$$3Br + 2NH_3 \longrightarrow 6HBr + N_2\uparrow \quad (1)$$

$$3Ca(OH)_2 + 6HBr \longrightarrow 3CaBr_2 + 6H_2O \quad (2)$$

$$3Ca(OH)_2 + 2NH_3 + 3Br_2 \longrightarrow 3CaBr_2 + 6H_2O + N_2\uparrow \quad (3)$$

In contrast to this, when formaldehyde is used as the reductant, gas evolution does not immediately begin. Rather, $CO_2$ evolution initiates when about $\frac{2}{3}$ of the bromine has been charged. Hence, the $CO_2$ which is first evolved reacts with lime to produce $CaCO_3$, usually in finely divided form. When the lime is exhausted or approximately so, $CaCO_3$ begins to react with bromine. Thus, the reaction sequence of a preferred embodiment of the instant invention is believed depictable as follows:

$$6Ca(OH)_2 + 4Br_2 + 2HCOH \longrightarrow 4CaBr_2 + 2CaCO_3 + 8H_2O \quad (4)$$

$$2CaCO_3 + 2Br_2 + HCOH \longrightarrow 2CaBr_2 + H_2O + 3CO_2\uparrow \quad (5)$$

$$6Ca(OH)_2 + 6Br_2 + 3HCOH \longrightarrow 6CaBr_2 + 9H_2O + 3CO_2\uparrow \quad (6)$$

The following examples illustrate the process of this invention in preferred embodiments.

One preferred embodiment of this invention is a process for making $ZnBr_2$, as illustrated below.

EXAMPLE 1

To a mixture of $Zn(OH)_2$ (149.1 g, 1.50 moles) and water (197.7 g), stirred mechanically, bromine (228.5 g, 1.43 moles) and formalin (60.5 g, 0.75 moles, 5% excess) were added simultaneously such that formalin addition was completed at about two-thirds of the bromine addition.

Initially, the mixture appeared to be poorly agitated, and a thick, stable foam persisted in the reactor. With about 75% of the bromine added, 0.5 g Dow-Corning Anti-Foam A was added to the reaction mixture. Bromine addition was resumed, and after about 15 minutes the foam had dissipated and agitation became excellent.

At the end of the bromine addition, the slurry had a red-brown color, and gas evolution was extremely slow. The mixture was treated with 19.3 g of 20% NaOH. Then filter aid (7 g) was added, the slurry was heated to about 80° C. and vacuum-filtered. The yellow filtrate (518 g) had a pH of 5.7. After several days, the product deposited a small amount of fine solids.

Another preferred embodiment of this invention is a process for making $CaBr_2$ fluid. Variations in process conditions, including using higher temperatures and adding all of the formaldehyde before the bromine, lead to less favorable results, as illustrated by the following examples:

EXAMPLE 2

Calcium Bromide Fluid Preparation

| Materials | |
|---|---|
| Slaked lime | 151.9 g (2.0 moles) |
| Tap water | 221.1 g |
| Bromine | 303.6 g (1.9 moles) |
| 37.4% formalin | 80.1 g (1.0 moles) |

The slaked lime and tap water were charged to a reactor, forming a slurry. An addition funnel was charged with the bromine and a second addition funnel was charged with the formalin.

About 4% of the formalin was added to the slurry before bromine flow was started. Bromine was added just above the slurry surface until the last one-third addition. No gas evolved until about 68% of the bromine was added, when it quickly became vigorous and was accompanied by some foaming. At this point, the formalin addition was about 97% complete, and total formalin addition time was 2.6 hours. Total bromine addition time was 3.75 hours. The reaction temperature was kept at 60°–73° C.

After a short heating period, 5 g filter aid was added and the slurry was heated to 90° C. and filtered. This filtration was fairly rapid, with 642 g of light pink filtrate being obtained in about 0.5 hr. This product had a pH of 5.6, an APHA of 64 and an oxidant level of <0.0005 millimoles thiosulfate/g.

Some of the product was treated with 10% NaOH (0.1 g to 154 g $CaBr_2$), causing rapid disappearance of the pink color. The treated product now had an APHA of 12 and a pH of 8.2. No clouding or sediment appeared over about one month standing.

EXAMPLE 3

Effect of Increasing Temperature

In this reaction, the same stoichiometries and relative rates of addition were used as in Example 2. However, the reaction temperature was allowed to reach 113° C.

When bromine addition was complete (2.3 hrs.), free bromine vapor remained above the slurry. Formalin (5.3 g) was added to the slurry over about one minute at 93° C., causing a large foam-up into the condenser. Most of the bromine vapors in the reactor were absorbed. An additional 4.2 g of formalin was added to the reactor. The bromine was completely consumed and the mixture was heated to a temperature of 120°–124° C. The $CaBr_2$ fluid product was further treated as follows.

The mixture was cooled to 90° C., and found to have a pH of 6.5. Addition of 2.0 g, 10% NaOH brought the pH to about 8.3. Then filter aid (5 g) was added and the product was filtered for 1.25 hours to give 582 g of deep yellow filtrate, with a pH of 7.3. Oxidants were not detected. Some of the product was adjusted to pH 8.7 with 10% NaOH, but no color change occurred.

After a three weeks standing, the solution was dark yellow (APHA>500) and had deposited a white sediment.

EXAMPLE 4

Effect of Complete Addition of Formaldehyde Before Bromine

This reaction used the same stoichiometries of Example 3 above, with the formaldehyde being added as solid paraformaldehyde (33.3 g, 1.0 moles).

The slaked lime, tap water and paraformaldehyde were charged to a reactor. The slurry thickened and formed lumps with addition of paraformaldehyde. After addition of about 8% of the bromine charge, the mixture had thinned and the lumps dissolved. Reaction temperature was limited to 68° C., and gas evolution began with 63.3% of bromine added. Gas evolution slowed noticeably at about 81% addition, and ceased at about 93% addition. The balance of the bromine was added, giving a red slurry and bromine vapor above the slurry. After about 0.5 hr. of heating, no apparent change occurred.

Paraformaldehyde was then added in 0.5–1.0 g increments until a total of 7.0 g had been charged to the flask. Gas evolution resumed and the bromine vapor was consumed after about 1 hr. at 60°–72° C. Filter aid (about 5 g) was added and the mixture was heated to about 90° C.

About 130 mls slurry was pipetted out and filtered to give a light pink product (182 g) with pH=6.7. Addition of about 0.1 g 10% NaOH to this product gave a colorless $CaBr_2$ solution of pH=8.7. After standing several hours, this portion assumed a light yellow color.

The remaining product slurry was adjusted to pH 8.4 with 10 g of 10% NaOH and filtered over 0.3 hrs. to give a second fraction (407 g). This fluid had a pH=8.3 and oxidant number of <0.001 m-m/g. The APHA color was 3, and appeared colorless after three weeks.

As can be seen by the above examples, increasing the temperature to 113° C. caused bromine loss and required the addition of excess formaldehyde. Similarly, addition of a stoichiometric amount of paraformaldehyde before bromine addition at 68° C. also required the addition of 25% excess formaldehyde before the bromine was exhausted.

The following example illustrates methods of improving the color and stabilizing the final product.

EXAMPLE 5

(CaBr$_2$ Fluid Preparation

| Slaked lime | 621.2 g (8.0 moles) |
| --- | --- |
| Br$_2$ | 1284.8 g (8.04 moles) |
| Formalin | 324.8 g (4.02 moles) |
| Tap water | 857.2 g |

The above materials were reacted according to the procedure given in Example 2. The slurry was divided into several roughly equal portions prior to filtration. These portions were worked up in the following manner.

A. 5 g (0.064 moles) of lime were added to 604 g of slurry containing about 0.08 moles of free bromine to a pH of 9.6 and a negative KI test. Filter aid (6 g 1% weight product) was added, followed by 30 ml. of 0.52 N HCl to a pH of 8.4. The slurry was filtered at 65° C. to give a product with APHA of 20 and a final pH of 8.6. After 2 weeks the pH was 8.9.

B. 3.2 g (0.08 moles) of NaOH (in a 20% solution) were added to 620 g of slurry containing 0.082 moles of free bromine to a pH of 8.1 and a negative KI test. Filter aid (6 g, 1% weight product) was added, and the product was filtered at 70° to give a product with APHA 4 and a final pH of 8.3. After 2 weeks the pH was 8.6.

C. 8 g (0.068 moles) of a concentrated NH$_4$OH solution were added to 623 g of slurry containing 0.082 moles of free bromine, to a pH of 8.5 and a negative KI test. Filter aid (6 g, 1% weight product) was added and the slurry was filtered at 70° C. to give a product with APHA 94 and a final pH of 8.0. After 2 weeks, the pH was 8.3.

It can thus be seen that a preferred embodiment of this invention is a process for preparing metal bromides comprising reacting CaCO$_3$ or Ca(OH)$_2$ with bromine in the presence of formaldehyde as reductant where the bromine and formaldehyde are added separately such that the formaldehyde addition is complete when approximately ⅔ of the bromine has been added.

A preferred temperature range is from about 60° to about 90° C. It is preferred to add the formaldehyde as an aqueous solution having a formaldehyde concentration of about 25-40%. In the formation of CaBr$_2$, it is preferred to use a lime mixture well dispersed in a finely divided form.

It is therefore apparent that a most preferred embodiment of this invention is a process for the preparation of CaBr$_2$, said process comprising reacting lime and bromine in an aqueous reaction medium using added formaldehyde as a reducing agent, said process being carried out by adding separately to a water-lime mixture bromine and an aqueous solution of about 25-40% formaldehyde, the relative rates of addition being such that the reaction temperature is maintained in the range of from about 60° to about 90° C. and the formaldehyde addition is complete when about two-thirds of the bromine has been added with the amount of bromine substantially stoichiometric or slightly less than stoichiometric with respect to said calcium compound, and with the amount of formaldehyde added being stoichiometric or slightly in excess of stoichetry with respect to bromine.

The above Examples suggest that the processes of this invention can be utilized to prepare alkali metal bromides, for example sodium bromide and potassium bromide. The processes exemplified also suggest use of this invention to prepare magnesium bromide and strontium bromide. It is suggested that the above bromides can be prepared from hydroxides or carbonates of the metals named.

The bromides if desired can be isolated from the solutions in which they are prepared and further purified. Alternatively, the solutions can be used as oil and gas well completion fluids or components thereof. Typical completion fluids are exemplified by those described in U.S. Pat. No. 2,898,294.

I claim:

1. A process for preparing basic metal bromides which comprises contacting in an aqueous medium a basic metal compound and bromine in the presence of added formaldehyde as a reducing agent.

2. A process of claim 1 wherein said metal compound is an alkaline earth metal compound.

3. A process of claim 2 wherein said alkaline earth metal compound is a calcium compound.

4. A process of claim 3 wherein said calcium compound is CaCO$_3$ or Ca(OH)$_2$.

5. A process of claim 1 wherein said basic metal compound is a zinc compound.

6. A process of claim 5 wherein said zinc compound is Zn(OH)$_2$.

7. A process of claim 4 being conducted at a temperature of from about 60° to about 90° C.

8. A process of claim 4 wherein said formaldehyde is added as an aqueous solution having a formaldehyde concentration of about 25-40%.

9. A process of claim 4 wherein said formaldehyde is added as solid paraformaldehyde.

10. A process of claim 4 wherein said bromine and formaldehyde are added separately to lime admixed with water such that the formaldehyde addition is complete when approximately ⅔ of the bromine has been added.

11. A process for the preparation of CaBr$_2$, said process comprising reacting lime and bromine in an aqueous reaction medium using added formaldehyde as a reducing agent, said process being carried out by adding separately to a water-lime mixture, (i) bromine, and (ii) an aqueous solution of about 25-40% formaldehyde, the relative rates of addition being such that the reaction temperature is maintained in the range of from about 60° to about 90° C. and the formaldehyde addition is complete when about two-thirds of the bromine has been added, with the amount of bromine being substantially stoichiometric or slightly less than toichiometric with respect to said calcium compound a d the amount of formaldehyde added being stoichiometric or slightly in excess of stoichiometry with respect to bromine.

12. A process of claim 11 conducted in a manner such that approximately 4 percent of the formaldehyde solution is added to the water-lime mixture prior to the addition of bromine.

* * * * *